Oct. 26, 1971   M. A. BARNETT ET AL   3,615,121

BEARING FOIL ANCHORING ARRANGEMENTS

Filed April 1, 1969

INVENTORS.
MORRIS A. BARNETT
EDWARD L. EDLEFSEN
BY   ROBERT D. JAMES

ATTORNEYS

United States Patent Office 3,615,121
Patented Oct. 26, 1971

3,615,121
BEARING FOIL ANCHORING ARRANGEMENTS
Morris A. Barnett, Palos Verdes Estates, Edward L. Edlefsen, Los Angeles, and Robert D. James, Gardena, Calif., assignors to The Garrett Corporation
Filed Apr. 1, 1969, Ser. No. 811,951
Int. Cl. F16c 17/16
U.S. Cl. 308—9  11 Claims

ABSTRACT OF THE DISCLOSURE

A foil anchoring arrangement for a fluid foil bearing is described especially as related to journal type and thrust type bearings. The arrangement includes a pin having a rectangular cross section and a foil which is spot welded to one surface. A channel in a stationary element of the bearing is provided to receive the pin partially wrapped by the foil and maintain it from rotating under the forces encountered by the foil during bearing operation.

BACKGROUND OF THE INVENTION

(1) Field of the invention

This invention relates to fluid foil bearings, and, more particularly, to arrangements for anchoring the bearing foils.

(2) Description of the prior art

One type of bearing which has aroused considerable interest in recent years, particularly for extremely high speed rotating machinery, has been the hydrodynamic foil bearing, sometimes referred to simply as a fluid foil bearing. Strictly speaking, hydrodynamic bearings are self-acting or self-pressurizing bearings in which the relative movement of a rotating shaft-and-bush combination develops viscous shear which draws a fluid lubricant in between the bearing surfaces to provide the desired lubrication. It should be noted that such bearings may be designed to use either a liquid or a gaseous lubricant. However, air is commonly used as a lubricant in such bearings particularly where extreme high speed is involved, and, for simplicity, the present invention will be described herein primarily in connection with the use of a gaseous lubricant, such as air or some other suitable gas. In many configurations, the use of one or more foils (i.e., thin metal sheets) extending about the rotating shaft member provides an improved type of high speed bearing. Foil gas bearings per se are inherently subject to a number of problems with respect to various types of instabilities which are likely to develop at various rotational speeds. Such problems are discussed, along with various configurations of gas-lubricated foil bearings of the prior art, in an article entitled "Some Instabilities and Operating Characteristics of High-Speed Gas-Lubricated Journal Bearings," by K. Fischer et al., ASME Paper 58A-231. Although the article discusses various problems mainly relating to limitations on high speed bearing operation, it fails to point to any ready solution to these problems, nor does it treat the problems which are encountered in operating gas bearings at low speeds such as are encountered during startup and coastdown or in starting from rest condition (zero r.p.m.). Proper control or elimination of high speed instabilities will permit the bearing to operate to the burst speed of the rotating assembly, typically approaching the speed of one million r.p.m. or more.

In many cases, the hydrodynamic fluid foil bearing is incapable of carrying the normal dynamic bearing loads at low speeds or during startup and coastdown. This is understandable, since in a typical hydrodynamic gas bearing, suitable lubrication of the bearing surfaces depends upon the effect of viscous shear which draws air in between the bearing surfaces which are loaded by the bearing load. As soon as the relative rotation of the bearing surfaces drops below some minimum level, the lubricating gas is no longer drawn into the region between the loaded bearing surfaces and the surfaces come into contact and may suffer damage to the bearing surfaces by scoring or overheating or at the very least increased drag. Additionally, fluid bearings encounter certain inherent instabilities at various rotational velocities which are related to the mass and geometry of the rotating device. These instabilities result in orbital excursions of the rotating member with the accompanying problem of possible contact between the rotating and stationary bearing surfaces, resulting in damage or destruction to the bearing. The use of foils, typically thin sheets of metal on the order of a few thousandths of an inch in thickness, alleviates the problems of bearing surface contact encountered during startup and coastdown and also in the vicinity of instability velocities. In such instances, any contact which would normally develop between the bearing surfaces is encountered between the rotating bearing surface and the stationary foils. The foils, being resilient, are better able to withstand the effect of such contacts, but still there are substantial forces imposed upon the foils which have a tendency to tear them, perhaps even yanking them loose from their positioning arrangements.

It will be understood that a foil bearing is typically comprised of a rotatable element, and a stationary element with suitable spacing between the adjacent surfaces. It additionally includes a number of foils usually anchored to the stationary element and disposed within the spacing. The foils have the advantages of accommodating eccentricity of the rotatable element and of providing a cushioning and dampening effect so as to reduce or eliminate the various inherent instabilities of the rotating structure.

In certain prior art fluid foil bearings, the foil is attached at one end along a line of engagement to a circular rod, with the rod being received in a circular cross-sectioned slot in the stationary element of the bearing. Generally, the foil extends from the stationary element into the spacing between the rotating and stationary elements in the direction of rotation of the rotating element. In this position, the rotating element develops a shearing action upon the fluid available for pressurizing the intervening space and a tension force upon the foil in the direction of rotation. This tension force tends to pull the foil from its rod, particularly when extraordinary forces are encountered on occasion by actual contact between the foil and the rotatable element. Wrapping the foils partially about the associated rods has not solved the problem because, since the rods are round, they rotate under this force so as to expose the point or points of attachment between the foil and the rod, usually several spot welds, and cause the foil to tear and eventually separate from the rod so as to cause bearing failure.

It is therefore a general object of the present invention to provide an improved fluid foil bearing arrangement.

It is a more particular object of the present invention to provide an improved arrangement for anchoring the foils of a fluid foil bearing.

Another object of the present invention is to provide a foil anchoring arrangement for fluid foil bearings in which the foils are not subject to tearing loose from their associated anchoring rods under forces normally encountered during operation of the bearing.

SUMMARY OF THE INVENTION

In brief, the present invention involves the attachment of a bearing foil to an associated anchor in the form of a rod or pin of non-circular cross section. The element of the bearing to which the foils are to be affixed is provided with a corresponding slot of a shape adapted to receive the foil rod with the foil at least partially wrapped around it and to retain the foil and its rod without permitting rotation thereof to the point where the foil is subject to being torn loose from its attachment to the rod. Preferably, an anchoring pin in the form of an elongated rod of rectangular cross section is employed. The foil is attached to the pin, preferably by spot welding, and partially wrapped around the pin. The foil-wrapped pin is then inserted in a slot, generally in the stationary element of the bearing, of rectangular cross section with dimensions such that it may readily receive the pin while preventing any roating thereof that might permit the unwinding of the foil from its wrapped juxtaposition about the pin.

In one particular arrangement in accordance with the invention comprising a journal type of bearing, the slots for receiving the foil-wrapped pins are longitudinally arranged at suitably spaced intervals about the interior surface of the bushing. The foil-wrapped pins are inserted within the slots in a manner which permits the foils to extend about the interior of the bushing in the direction of intended rotation of the bearing shaft. When the bearing shaft is inserted within the opening provided by the foils and bushing combination, operation of the bearing may be effected in conventional fashion.

In another particular arrangement in accordance with the invention, a thrust bearing is provided in which the individual foils are positioned upon a foil support plate which is inserted between the thrust runner and the bearing mounting plate. Each foil is affixed to and partially wrapped around an anchoring pin of rectangular cross section and extends circumferentially about the foil support plate in the direction of rotation of the thrust runner. In this configuration, the foil anchoring pins extend substantially radially and are received within substantially radial slots suitably spaced about the face of the foil support plate. In a preferred embodiment, the anchoring pins are a rectangular cross section and are retained against rotation thereof by the rectangularly cross-sectioned slots in which they are positioned.

BRIEF DESCRIPTION OF THE DRAWINGS

A better understanding of the present invention may be had from a consideration of the following detailed description, taken in conjunction with the accompanying drawings, in which.

DESCRIPTION OF THE PREFERRED EMBODIMENTS

Figure 1:
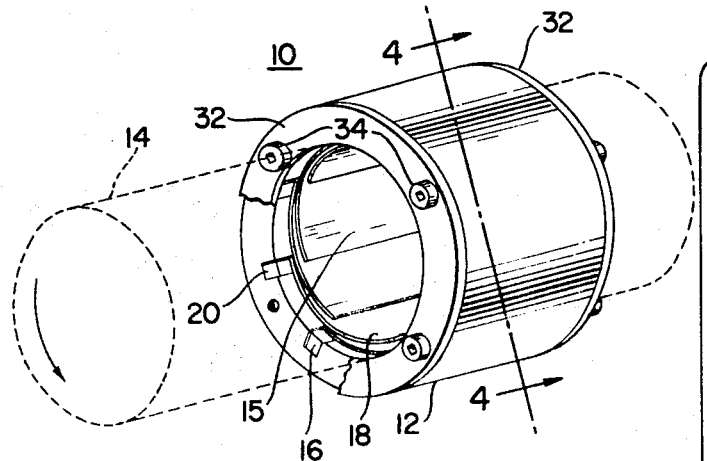
FIG. 1 is a perspective view of a journal type bearing, illustrating the placement of foil anchoring arrangements in accordance with the present invention.

Referring now to the drawings wherein like reference numerals designate like or corresponding parts throughout the several views, there is illustrated in FIG. 1 a fluid bearing 10 of the journal or radial type, having a stationary element such as a bushing 12 and a rotatable element such as a shaft 14 which is illustrated in phantom lines. Within the interior 15 of the bushing 12 are located a plurality of foil anchoring arrangements comprising pins 16, foils 18, and channels 20.

Figure 2:
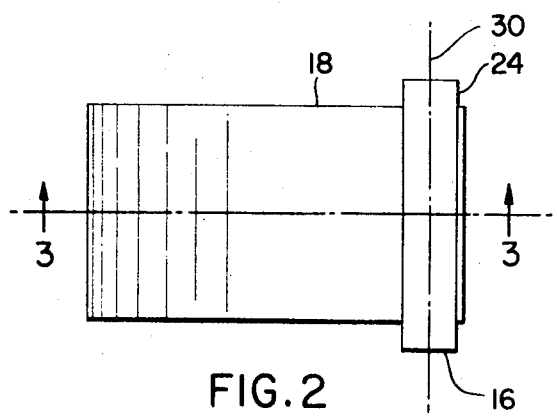
FIG. 2 is a plan view of a foil attached to a pin.
Figure 3:
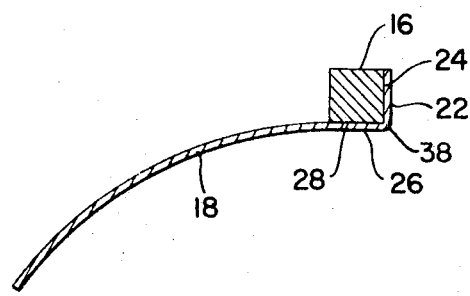
FIG. 3 is a sectioned side view taken along line 3—3 of FIG. 2.

Referring now to FIGS. 2 and 3, there is illustrated in more detail a preferred embodiment of the pin 16 and foil 18 combination. The pin in FIG. 3 clearly illustrates a rectangular cross section with the foil 18 being bent 90° so as to have a short arm portion 22 adjacent to the surface 24 of the pin, while a long arm portion 26 is adjacent to the pin surface 28. The pin surfaces 24 and 28 are immediately adjacent and at right angles to each other, and generally extending parallel to the longitudinal axis of the pin 16 as signified by the center line 30, FIG. 2. Although a pin of square cross section is shown, it will be appreciated that it need not be so constructed. A pin of rectangular or other non-circular section may be equally suitable, so long as its relationship to the corresponding recess in the foil retainer (FIGS. 4 and 5) prevents its rotation.

The pin and foil may be of any suitable size and material; however, in a preferred arrangement, for example, bearing material including the material of the pin and the foil is generally stainless steel or an Inconel alloy, so as to have sufficient strength at the relatively high temperatures which are often encountered in fluid foil bearing operation. The foil may have a thickness under 0.025 inch, whereas the pin as shown may have a square cross section with a 0.065 inch side, and have a length of about 1.5 inches. The width of the foil may vary from 1 to 1.5 inches. Generally, it is desirable to have the pin extend slightly beyond both edges of the foil so as to allow a secure fit of the foil and prevent damaging the sides of the foil during handling and operation.

A convenient way of attaching the foil is to spot weld the foil arm portion 22 to the pin along the surface 24 while allowing the foil arm 26 to be juxtaposed adjacent the surface 28 of the pin, but not necessarily attached thereto.

Referring now to FIG. 4 and once again to FIG. 1, there is illustrated the placement of eight foil anchoring arrangements as described, equally spaced radially within the bushing 12. The bushing 12 has eight channels such as 20, each having two lateral sides 31 and 33 and a base 35 corresponding to the rectangular cross section of the pin 16 with the sides 31 and 33 being perpendicular to the base 35. The channels extend in a direction parallel to the longitudinal axis of the bushing 12. Each pin 16 with its attached foil 18 is placed within a corresponding slot 20, such as by being slid into the channel from one of the ends of the bushing 12 and then having the ends of the bushing covered such as by an annular retainer 32 (FIG. 1) which may be conveniently attached as by screws 34. The material of the bushing 12 and the shaft 14 may be comprised of any suitable material, preferably stainless steel or an Inconel alloy for the same reasons as mentioned above for the pin and foil; that is, high strength and good high temperature properties.

Figure 4:
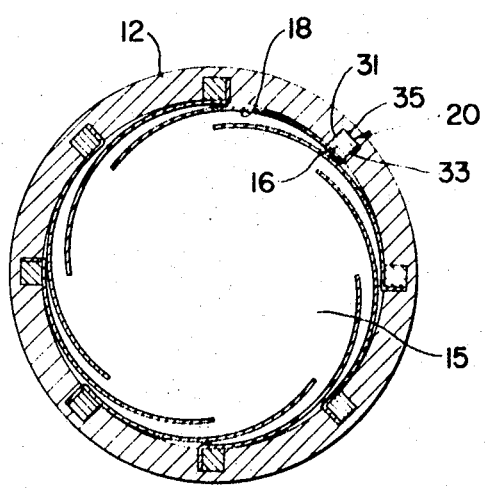
FIG. 4 is a sectioned and side view of the arrangement of FIG. 1.

As illustrated in FIGS. 1 and 4, the foil 18 bends 90° about the pin 16 and extends generally counterclockwise in the interior 15 of the bushing 12. Thus, the shaft (not shown) would rotate within the bushing 12 in a counterclockwise direction and spaced from the interior 15 of the bushing. As shown, the foils subtend an arc of about 90°, thereby overlapping an adjacent foil by about 45°.

It is clear that by placing the rectangular cross-sectioned pin 16 into the channel 20 with the surface 26 opposite the shaft, the forces of the shaft upon the foil do not cause a rotation of the pin so as to expose the attachment arm portion 22 to the spacing between the bushing and the shaft. Instead, the pulling force on each foil will be distributed along the juncture, designated 38, between the arms 22 and 26, FIG. 3. Thus, the forces applied to the foil are distributed along the entire width of the foil, rather than being concentrated at a few points as would occur if the arm 22 were exposed to tension forces at its attachment, since the spot weld or other suitable attaching mechanism causes the foil to be weakened by presenting less effective area over which the forces are distributed.

Figure 5:
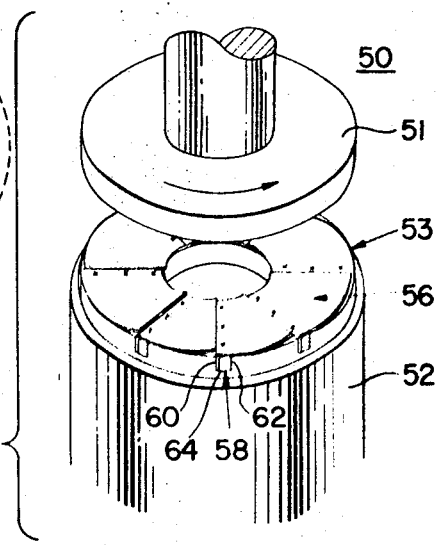
FIG. 5 is an exploded perspective view of a thrust type bearing in accordance with the invention illustrating the placement of foil anchoring arrangements therein.

Referring now to FIG. 5, there is illustrated the placement of a particular foil anchoring arrangement for a thrust bearing 50 in accordance with the invention. The thrust bearing shown comprises a rotatable element such as a thrust runner 51 and a stationary element such as a mounting plate or base 52 on which a foil assembly 53 is affixed. The assembly 53 comprises a plurality of foil-pin combinations 56 spatially distributed about the face of the base 52 and secured thereto. Each foil-pin combination 56 is retained in a radial channel 58. The foil-pin combination is similar to the pin 16 and foil 18 combination of FIGS. 1–4 except that the foils are arcuate so as to be positioned in the annular fashion as shown. Likewise, the channels 58 have two lateral surfaces 60 and 62 perpendicular to a base 64, similar to the channel 20 of FIG. 4.

In an alternative configuration for a thrust bearing such as is shown in FIG. 5, the foil assembly 53 may be fabricated as a distinct unit separate from the base 52. In such a case, the base 52 and assembly 53 may be provided with suitable mating locking means, such as mating pins and notches or holes, to prevent relative rotation between the two. Except for the fact that the foil assembly 53 would have its own base plate in which the foil-pin combinations 56 are retained, the structure of such an alternative configuration would be the same as is shown in FIG. 5.

In the foil anchoring arrangements of the thrust bearing of FIG. 5 as in the journal bearing of FIGS. 1–4, the depicted structures in accordance with the invention serve to distribute the forces encountered by the foils and prevent their concentration at the points where the foil is attached to its anchoring pin. Moreover, the rectangular cross sections of both the anchoring pins and the pin-receiving slots serve to prevent the rotation of the anchoring pins when tension forces are applied to the foils, thus preventing the exposure of the spot welds between the foils and pins to the concentrated tension forces which would normally tear the foils loose from their associated anchor pins. Non-circular foil anchoring arrangements other than the rectangular ones shown and described above may be employed without departing from the spirit and scope of the invention. Although a configuration is preferred in which the foils are partially wrapped about their respective anchoring pins, the foil such as 18 need not be wrapped about the pin such as 16 of the invention. The fact that each pin such as 16 is prevented from rotation by foil tension prevents tension forces from being applied to the spot welds or other points of fastening the foil to the pin, thus strengthening the assembly and improving its performance in use.

It is to be noted that while a journal type bearing and a thrust type bearing have been described, the foil anchoring arrangements may be used in other types of fluid bearings, such as linear foil bearings, single or double conical foil bearings and the like. Additionally, it is to be noted that the materials and dimensions disclosed for the preferred embodiments are not to be considered as limiting the invention.

Although there have been described above specific arrangements of foil anchoring arrangements for a fluid foil bearing in accordance with the invention for the purpose of illustrating the manner in which the invention may be used to advantage, it will be appreciated that the invention is not limited thereto. Accordingly, any and all modifications, variations or equivalent arrangements which may occur to persons skilled in the art should be considered to be within the scope of the invention.

What is claimed is:

1. A foil anchoring arrangement for a fluid foil bearing, comprising:
   an elongated pin having a non-circular cross section;
   a foil attached to said pin along its elongated dimension and at least partially wrapped about the pin; and
   supporting means having a channel of non-circular cross section adapted to engage the non-circular cross section of the pin to prevent rotation of the pin and unwrapping of the foil.

2. A foil anchoring arrangement for the fluid foil bearing, comprising:
   an elongated pin having a rectangular cross section;
   a foil attached to said pin along one side thereof; and
   supporting means having a channel, the lateral sides of which are generally perpendicular to the base for engaging the pin against rotation within the channel.

3. A foil anchoring arrangement as set forth in claim 2, wherein:
   the foil is attached to a first surface of the pin, said surface extending parallel to the longitudinal axis of said pin.

4. A foil anchoring arrangement as set forth in claim 3, wherein:
   the foil is bent about a corner edge of the pin so as to extend along a second surface of the pin, said second surface being immediately adjacent said first surface, and extending parallel to the longitudinal axis of the pin.

5. A foil anchoring arrangement as set forth in claim 2, wherein:
   the support means comprises an element of a bearing having movable and stationary elements; and
   the channel extends generally perpendicular to the relative motion between said movable and stationary elements.

6. A foil anchoring arrangement as set forth in claim 5, wherein:
   the support means comprises a stationary element of the bearing.

7. A foil anchoring arrangement as set forth in claim 6, wherein:
   the stationary element is a bushing adapted to receive a rotatable shaft; and
   the channel extends along the interior of the bushing parallel to the longitudinal axis of said shaft.

8. A foil anchoring arrangement as set forth in claim 6, wherein:
   the stationary element comprises an annular face in a thrust bearing configuration;
   the channel extends radially along said annular face; and
   the foil extends from the pin generally circumferentially about the annular face.

9. A fluid foil bearing comprising:
   a pair of load-supporting elements arranged for relative rotation with respect to each other;
   a plurality of foils positioned between the two elements and substantially regularly spaced relative to one another;
   means for anchoring the individual foils in a predetermined position comprising a plurality of rectangular pins individually affixed to corresponding foils substantially along a leading edge thereof relative to the direction of rotation; and
   means for engaging and retaining said first-mentioned means in a position such that the foil is at least partially wrapped about said first-mentioned means and for preventing the unwrapping of the foil therefrom.

10. A fluid foil bearing arranged in accordance with claim 9, wherein:

the bearing is of the journal type; and wherein said last-mentioned means comprises a plurality of rectangular cross-sectioned slots in the interior of a bushing of the bearing.

11. A fluid foil bearing arrangement in accordance with claim 9, wherein:

the bearing is of the thrust bearing type; and said last-mentioned means comprises a plurality of rectangular cross-sectioned slots radially positioned within the face of a first of said pair of elements adjacent the other of said pair and substantially equally spaced about the axis of rotation.

References Cited

FOREIGN PATENTS 1,454,024  10/1966  France _____ 308—9

FRED C. MATTERN, Jr., Primary Examiner

F. SUSKO, Assistant Examiner